Patented Aug. 22, 1933

1,923,672

UNITED STATES PATENT OFFICE 1,923,672

RECOVERY OF FURFURAL FROM FILTER CAKES CONTAINING IT

Alphons O. Jaeger, Mount Lebanon, Pa., assignor to The Selden Company, Pittsburgh, Pa., a Corporation of Delaware No Drawing. Application May 28, 1930
Serial No. 456,817

4 Claims. (Cl. 202—46)

This invention relates to the recovery of solvents, and more particularly solvents containing furfural and its homologues. Furfural and its homologues have important solvent properties and have been used particularly in the purification of crude or impure anthracene.

Furfural and its homologues constitute the most effective solvents for the purification of crude anthracene and are also effective in the purification of crude anthraquinone. Furfural, however, boils at a relatively high temperature and if a sufficiently high temperature is used to remove all of the furfural, considerable polymerization takes place, resulting in losses of material. I have found that furfural can be removed from the cakes of purified anthracene or anthraquinone or from the residue obtained by evaporating the filtrate in such processes, which cakes in the case of crude anthracene contain largely phenanthrene and carbazole, by distilling with steam. A constant boiling mixture is obtained which contains about 30–35% of furfural. On condensing the vapors, furfural can be separated from water by decanting, and if it is desired to remove the last traces of furfural a solvent for furfural can be used, such as benzol, which is immiscible with water. If desired the vapors of the immiscible solvent for furfural may be added to the steam in the distillation, forming a ternary azeotropic mixture. In addition to benzol, chlorinated compounds such as orthodichlorbenzene may be used, and in fact any ordinary solvent for furfural which is immiscible with water may be substituted.

Not only does the steam thoroughly remove the last traces of furfural, but the operation takes place at a lower temperature which minimizes polymerization, and the steam itself is an antipolymerization catalyst so that the small amount of condensation or polymerization which might ordinarily take place at the low temperatures is almost entirely prevented by the presence of the steam.

When the furfural is being removed from cakes which do not contain volatile solids that would tend to form an emulsion with water, the addition of an immiscible solvent is not necessary as the furfural which remains in the water layer after decantation can be recovered by adding this water layer which contains 6–8% furfural to the water which is being evaporated to form fresh amounts of steam. The furfural in the water layer, of course, comes off with the steam in the form of the constant boiling mixture, and a very high percentage of recovery is made possible.

Where, however, solids are present in the cake which are volatilized by the steam, difficulties may arise by reason of the fact that many solids present in crude anthracene form emulsions with water from which furfural cannot be easily separated. In these cases, of course, the modification using the immiscible organic solvent should be employed.

The invention will be described in greater detail in connection with the following specific examples which are illustrations of some of the preferred embodiments of the invention.

Example 1

An anthracene cake from the purification of crude or semi-purified anthracene by means of furfural is steam distilled; the vapors are condensed, permitted to separate into two layers and the furfural decanted off. The water, containing from 6–8% furfural, is added to the steam generator so that its furfural content is recovered.

As the azeotropic mixture of water and furfural contains from 30–35% furfural, only 4–6% of furfural, representing from 8–12% of the total furfural in the vapors, is retained by the water and has to be recirculated, the rest of the furfural being retained in a form which can be reused, if necessary after drying, which can be effected in any of the usual methods or by heating the furfural to a temperature at which the water boils off in the form of an azeotropic mixture, which of course can be added to the vapors from the recovery still.

Example 2

A phenanthrene-carbazole residue obtained by vaporizing the furfural filtrate from the purification of crude anthracene is steam distilled, as described in Example 1, and the vapors condensed. The condensate is an emulsion from which furfural can be readily separated, and is treated with sufficient benzol, solvent naphtha or orthodichlorbenzene to dissolve all of the furfural present. A sharp separation of two layers takes place and the solvent or water layer is drawn off. In this case the water can be thrown away but as it may contain small amounts of solvent and furfural it is preferable to return it to the steam generator. The furfural can be separated from the benzol, or solvent naphtha by fractional distillation in the usual manner.

Example 3

The cake from the furfural purification of crude anthraquinone is subjected to steam distillation as described in Example 1. The vapors on condensing ordinarily do not contain sufficient solids to emulsify the furfural and the separation by the miscible organic solvent is, therefore, not necessary. After decanting off the furfural, the water layer is returned to the steam generator as described in Example 1.

What is claimed as new is:

1. A method of recovering furfural solvent from a filter cake obtained by the purification of crude aromatic hydrocarbons by means of a solvent containing furfural, which comprises subjecting the cake to the action of a carrier vapor containing steam, condensing the vapors, decanting the furfural from the water layer, distilling the water layer containing the dissolved furfural and using the vapors from this distillation as at least part of the carrier vapors used in treating the filter cake.

2. A method according to claim 1, in which the filter cake is from the furfural purification of crude anthracene and contains as its major constituent anthracene.

3. A method according to claim 1, in which the filter cake is from the furfural purification of crude anthracene and contains phenanthrene and carbazole as its major constituents.

4. A method according to claim 1, in which the filter cake contains volatile emulsion forming constituents and the separation of furfural from the water takes place by means of a solvent for furfural which is immiscible in water.

ALPHONS O. JAEGER.